United States Patent [19]

Martino

[11] 4,402,442
[45] Sep. 6, 1983

[54] VEHICLE TOP SAIL AND SURF BOARD CARRIER

[76] Inventor: Samuel C. Martino, P.O. Box 1995, Riverview, Fla. 33569

[21] Appl. No.: 308,178

[22] Filed: Oct. 2, 1981

[51] Int. Cl.³ ............................................. B60R 9/04
[52] U.S. Cl. .................................. 224/324; 224/325; 224/327
[58] Field of Search ............... 224/318, 320, 324, 325, 224/327, 329, 917; 264/274; 206/583, 451, 452, 454

[56] References Cited

U.S. PATENT DOCUMENTS

| | | | |
|---|---|---|---|
| 2,134,635 | 10/1938 | Boeuf | 224/325 |
| 2,805,058 | 9/1957 | Grant | 264/274 X |
| 2,914,231 | 11/1959 | Hornke | 224/327 X |
| 3,313,511 | 4/1967 | Koerner et al. | 224/329 X |
| 3,655,034 | 4/1972 | Stollman et al. | 206/454 |
| 4,016,976 | 4/1977 | Cosper | 206/583 X |
| 4,301,109 | 11/1981 | Kain | 264/274 X |
| 4,326,655 | 4/1982 | Gradek et al. | 224/324 |
| 4,330,065 | 5/1982 | Haddad | 224/917 X |

FOREIGN PATENT DOCUMENTS

| | | | |
|---|---|---|---|
| 177071 | 5/1953 | Fed. Rep. of Germany | 224/324 |
| 2707666 | 8/1978 | Fed. Rep. of Germany | 224/324 |
| 556983 | 2/1957 | Italy | 224/324 |
| 61913 | 1/1940 | Norway | 224/324 |
| 316062 | 9/1956 | Switzerland | 224/324 |

*Primary Examiner*—William T. Dixson, Jr.
*Assistant Examiner*—Gary E. Elkins
*Attorney, Agent, or Firm*—Harvey B. Jacobson

[57] ABSTRACT

Two pairs of resilient body blocks are provided with each pair of blocks interconnected by an elongated, flexible, stretchable and elastic tether member extending and connected therebetween. The blocks include adjacent sides having grooves formed therein opening laterally outwardly of the blocks toward each other. The grooves parallel each other and are open ended and embracingly receive opposite longitudinal side edges of a sail or surf board therein with the pairs of blocks spaced longitudinally of the board and the tether members thereof functioning to clamp the board between the pairs of blocks. The side edges of the grooves are spaced inwardly of the corresponding side surfaces of the blocks and the board, with the blocks supported therefrom, may be disposed in horizontal position atop a vehicle with the undersides of the blocks engaging the vehicle top and the blocks supporting the board in spaced relation relative to the vehicle top. Suitable tie down straps may be secured between opposite sides of the vehicle top and over the board in order to maintain the board in position on the vehicle top. Further, the blocks spaced along one side edge of the board may be used to support the board in edge upstanding position from a suitable horizontal support surface when the board is being stored.

5 Claims, 4 Drawing Figures

VEHICLE TOP SAIL AND SURF BOARD CARRIER

BACKGROUND OF THE INVENTION

Various forms of car top carriers heretofore have been provided for supporting and carrying a surf or sail board on the top of a vehicle. However, most of these carriers must be permanently attached to the vehicle top or use suction cups for support of the carrier from the top and such suction cups tend to mar the finish of the vehicle top. In addition, car top carriers of the removable type may not be conveniently utilized for storage of the surf or sail board when the latter is not in use.

Accordingly, a need exists for a support and storage structure for use in conjunction with a sail or surf board and which may be conveniently utilized to support a board from a vehicle top and also for support of the board in spaced relation relative to suitable supporting surfaces when the board is being stored.

Examples of previously known forms of surf and sail board car top carriers and storage devices including some of the general structural and operational features of the instant invention are disclosed in U.S. Pat. Nos. 3,104,042, 3,283,972, 3,339,607, 3,893,606 and 4,007,862.

SUMMARY OF THE INVENTION

The vehicle top sail and surf board carrier of the instant invention includes two pairs of resilient body blocks with each pair of body blocks being laterally spaced apart and including an elongated, flexible, stretchable and elastic tether member extending and connected therebetween yieldingly biasing the blocks toward each other when the tether member is stretched. The blocks include adjacent sides and grooves formed in the adjacent sides opening laterally outwardly thereof toward each other. The grooves parallel each other, are opened ended and are adapted to embracingly receive opposite longitudinal side edges of a board therein. The pairs of blocks are spaced longitudinally of an associated board and the elastic tether members extending between the pairs of blocks function to clamp the board between opposite side blocks of the pairs of blocks.

The longitudinal side edges of the grooves formed in the blocks are spaced inwardly of the corresponding side edges of the blocks and, accordingly, the blocks project outwardly from the top and bottom surfaces of an associated surf or sail board. Accordingly, the surf or sail board may be positioned atop a vehicle with the undersurfaces of the pairs of blocks engaged with the vehicle top and the board supported in spaced relation above the top. Thereafter, elongated flexible strap members may be anchored relative to opposite sides of the vehicle top and passed over the surf board for the purpose of securing the surf board in the desired position upon the associated vehicle top.

The main object of this invention is to provide a support and storage structure for a sail or surf board which may be conveniently utilized to support a sail or surf board from a vehicle top in a manner protecting not only the board from engagement with the top but also protecting the finish surface of the top from dilatorious abrasive action as a result of support of the board from the top.

Another object of this invention is to provide a support and storage structure in accordance with the preceding objects and constructed in a manner whereby the support and storage structure may be supported from an associated vehicle top independent of any direct permanent or semi-permanent attachment of the support and storage structure to the top.

A still further object of this invention is to provide a support and storage structure which may also be utilized to conveniently store a surf or sail board in edge upstanding relation from a floor surface adjacent a wall surface and with the board maintained in spaced relation relative to both the floor surface and the wall surface.

A final object of this invention to be specifically enumerated herein is to provide a support and storage structure for a sail or surf board in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
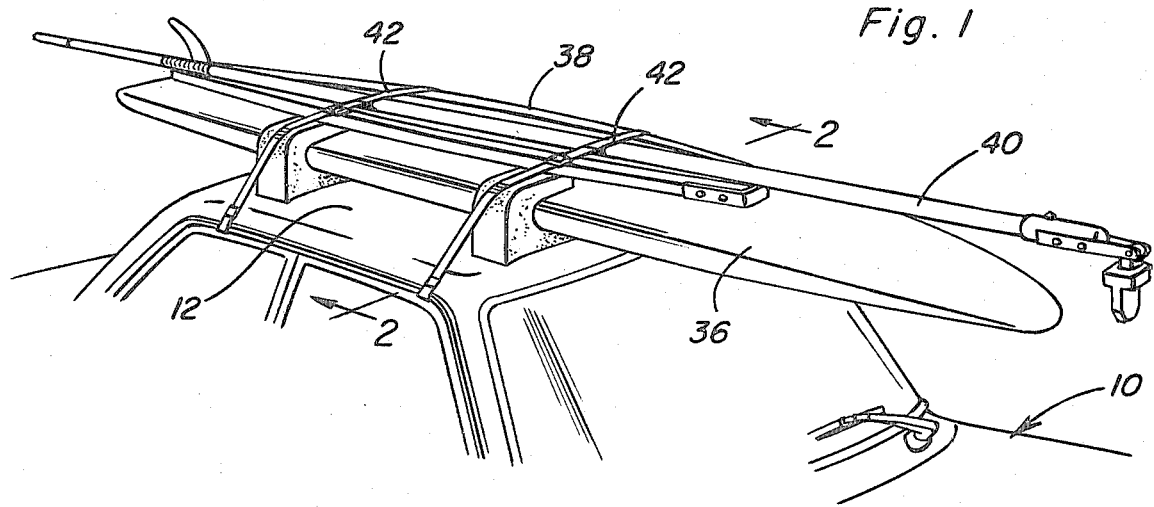
FIG. 1 is a perspective view of a sail board supported atop a vehicle through utilization of the support and storage structure of the instant invention.

Referring now more specifically to the drawings, the numeral 10 generally designates a vehicle including a generally horizontal top 12 from which it is desired to support a sail board in generally horizontally position with the sail board extending longitudinally of the vehicle.

The support and storage structure of the instant invention is referred to in general by the reference numeral 14 and comprises two pairs of resilient body blocks 16 with each pair of body blocks 16 connected together through the utilization of an elongated, flexible and stretchable elastic tether member 18. The opposite end portions of the tether member 18 are embedded in the blocks 16 and have enlargements 20 thereon preventing withdrawal of the end portions of the tether member 18 from the blocks 16. The blocks lightweight, 16 are constructed of a foam plastic which renders the blocks form retentive and yet somewhat resilient. Each pair of blocks 16 includes a pair of adjacent faces or sides 22 and each block 16 has an elongated groove 24 formed therein opening laterally outwardly of the side or face 22 thereof. The sides or faces 22 may be considered as inner sides or faces and the blocks 16 additionally include substantially planar vertical outer side faces 26 as well as top and bottom faces 28 and 30. The faces 30 are slightly contoured to conform to the curvature of the opposite side marginal portions of the top 12 and the corners of the blocks 16 defining the intersection between the sides 26 and 28 thereof are rounded as at 32.

Figure 2:
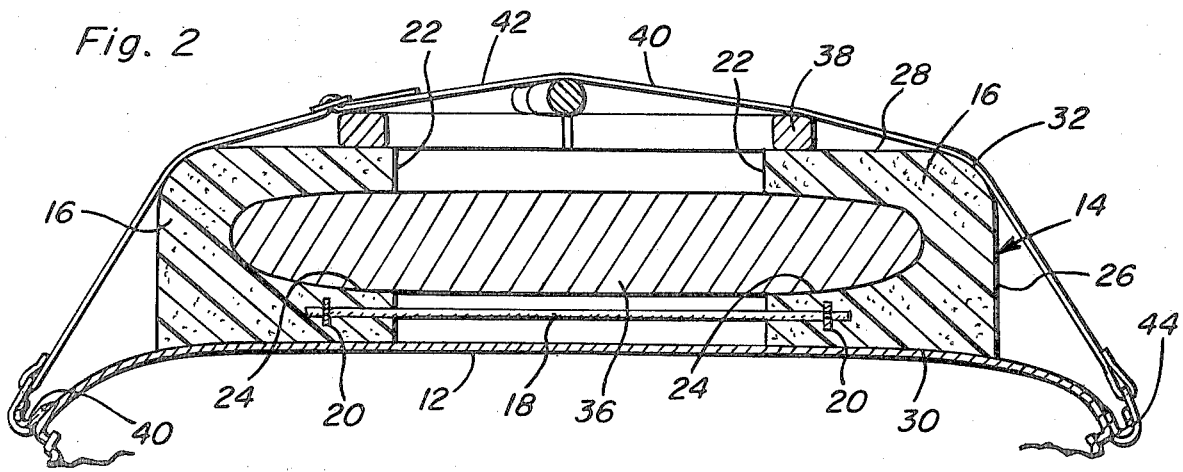
FIG. 2 is an enlarged fragmentary vertical sectional view taken substantially upon the plane indicated by the section line 2—2 of FIG. 1.
Figure 3:
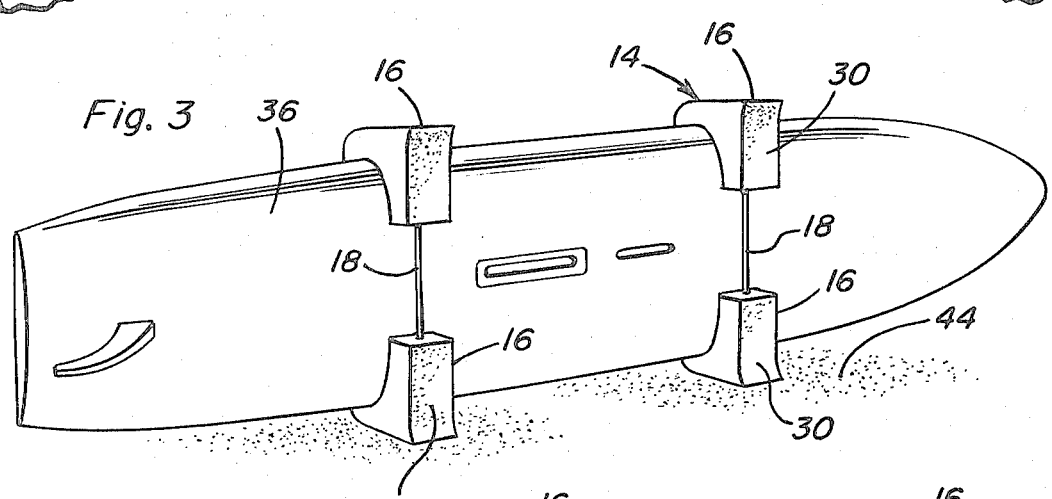
FIG. 3 is a perspective view illustrating the manner in which the support and storage structure may be operatively associated with a sail board for support of the sail board in edge upstanding relation from a horizontal support surface.
Figure 4:
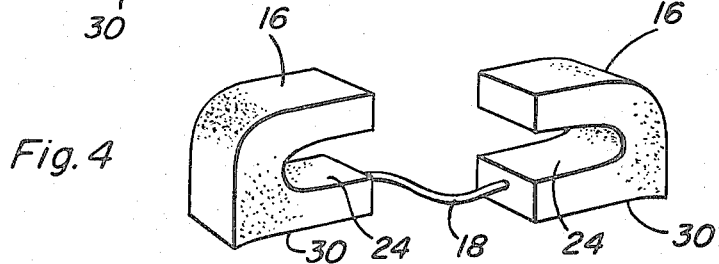
FIG. 4 is a perspective view of one pair of the resilient body blocks of the instant invention with the associated elastic tether member secured and extending between the blocks.

In order to use the support and storage structure 14, each pair of blocks 16 is merely engaged with opposite longitudinal side edges of a sail or surf board 36 in the manner illustrated in FIGS. 1, 2 and 3 of the drawings with the two pairs of blocks 16 spaced longitudinally of the board 36. Thereafter, the board 36 may be positioned on the top 12 and the sail bow 38 and mast 40 of the sail board 36 may be positioned in the manner illustrated in FIGS. 1 and 2 with the sail bow 38 overlapping adjacent marginal portions of the blocks 16 and the mast 40 overlapping the sail bow 38. Then, a pair of readily available gutter clip equipped adjustable length strap assemblies 42 may be engaged with the opposite side gutter portions 44 of the top 30 and tightened over the pairs of blocks 16 as well as the sail bow 38 and the mast 40. In this manner, the sail board 36, the blocks 16, the sail bow 38 and the mast 40 may be securely retained in position upon the vehicle top 12 without damage to either the board 36 or the exterior finish of the top 12. Of course, the blocks 16 may be readily engaged with the board 36 by first engaging one block 16 of each pair of blocks with one edge of the board 36 and thereafter displacing the other block 16 of each pair of blocks away from the first block in order to stretch the associated tension member to thereby enable the second block 16 to also be engaged with the opposite longitudinal side edge of the board 36.

When the user of the support and storage structure 14 wishes to remove the board 36 from the vehicle top 12 it is merely necessary to release the strap assemblies 42 and to thereafter carry the board 36 with the support and storage structure 14 supported therefrom into a suitable interior building storage area, such as that illustrated in FIG. 3 of the drawings, whereupon the outer sides 26 of one pair of the blocks 16 may be rested upon a suitable support surface 44 in order to support the board 36 in edge upstanding position. The other pair of blocks 16 remote from the surface 44 may be engaged with an adjacent wall surface, if desired. Further, although the blocks may be most inexpensively constructed of expanded foam plastic material, they may also be constructed of rubber or expanded foam rubber.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle roof including opposite side marginal portions and a surf/sail board to be carried on said roof, a pair of support assemblies for longitudinally spaced portions of said board and for supporting said board in closely spaced relation above said roof, each of said support assemblies including a pair of laterally spaced apart lightweight resilient body blocks, elongated, flexible, stretchable and elastic tether means extending and connected between each pair of blocks yieldingly biasing said blocks toward each other when said tether means is stretched, each pair of said blocks including adjacent sides and top and bottom surfaces as well as remote sides, said pairs of blocks being spaced apart along the longitudinal extent of said roof with the blocks of each pair of blocks supported from opposite side marginal portions of said roof, said adjacent sides having horizontal open ended grooves formed therein spaced above said bottom surfaces opening toward each other, said board being disposed in horizontal position closely over and extending longitudinally of said roof with opposite side marginal portions of said board embracingly and seatingly received in the corresponding grooves and with said pairs of blocks spaced along and engaging said longitudinal spaced portions of said board and said elongated tether means extending between each pair of blocks being in a stretched condition and functioning to clamp said board between said blocks, said tether means extending between portions of said pairs of blocks disposed below said grooves and being spaced above said vehicle roof, an elongated flexible and tensioned strapped passed over the top surfaces of each pair of blocks and having opposite end portions directed downwardly from said blocks and anchored relative to said opposite side marginal edge portions of said roof securing said blocks, and thus said board, in position on said roof against shifting relative thereto.

2. The structure of claim 1 wherein said blocks are constructed of expanded foam plastic material.

3. The structure of claim 2 wherein said elastic tether means comprises an elongated flexible elastic tether member having its opposite ends embedded in said blocks.

4. The structure of claim 3 wherein the opposite ends of said tether member embedded in said blocks include enlargements anchored thereto also embedded in said blocks.

5. The structure of claim 1 wherein the bottom surfaces of said blocks are slightly contoured to conform to the opposite side curved marginal portion of said vehicle roof.

* * * * *